(12) United States Patent
Veit

(10) Patent No.: US 9,822,490 B2
(45) Date of Patent: Nov. 21, 2017

(54) VIBRATION ABSORBER ARRANGEMENT

(71) Applicant: Gunther Veit, Bingen (DE)

(72) Inventor: Gunther Veit, Bingen (DE)

(*) Notice: Subject to any disclaimer, the term of this patent is extended or adjusted under 35 U.S.C. 154(b) by 154 days.

(21) Appl. No.: 14/649,415

(22) PCT Filed: Dec. 6, 2012

(86) PCT No.: PCT/EP2012/074714
§ 371 (c)(1),
(2) Date: Jun. 3, 2015

(87) PCT Pub. No.: WO2014/086426
PCT Pub. Date: Jun. 12, 2014

(65) Prior Publication Data
US 2015/0345083 A1    Dec. 3, 2015

(51) Int. Cl.
 E01B 9/62         (2006.01)
 F16F 1/40         (2006.01)
 E01B 19/00        (2006.01)

(52) U.S. Cl.
CPC .............. *E01B 9/62* (2013.01); *E01B 19/003* (2013.01); *F16F 1/40* (2013.01)

(58) Field of Classification Search
CPC ............ E01B 9/62; E01B 9/68; E01B 19/003
See application file for complete search history.

(56) References Cited

U.S. PATENT DOCUMENTS 6,402,044 B1 * 6/2002 Sato .......................... E01B 5/08
                                                       238/382

FOREIGN PATENT DOCUMENTS

| EP | 22298992 A2 | 3/2011 |
|----|-------------|--------|
| JP | 2006144409  | 6/2006 |
| WO | WO2014086426 A1 | 6/2014 |

* cited by examiner

Primary Examiner — R. J. McCarry, Jr.
(74) Attorney, Agent, or Firm — Maginot, Moore & Beck, LLP

(57) ABSTRACT

The invention relates to a vibration absorber arrangement (2) for attaching at least one vibration absorber (4) to a rail (1), comprising: a clamping means (3) which has a clamp fastening portion (12) and a fastening portion (11) for at least one vibration absorber (4) on the outside thereof, wherein the clamp fastening portion (12) can be clamped between one end (16) of a clamp (5) and a foot (8) of the rail (1) and the fastening portion (11) presses with its inside against a web (9) of the rail (1), the clamp (5) being formed as an integral spring clip.

24 Claims, 8 Drawing Sheets

VIBRATION ABSORBER ARRANGEMENT

The present invention relates to a vibration absorber arrangement for attaching at least one vibration absorber to a rail.

This application is a 35 U.S.C 371 National Stage application of PCT/EP2012/074714, filed Dec. 6, 2012. The entire contents of the above-mentioned patent application are incorporated herein by reference as part of the disclosure of this U.S. application.

EP 1 693 516 A1 discloses a vibration absorber arrangement for attaching at least one vibration absorber to a rail. In that document, the vibration absorber arrangement has a ribbed plate with two substantially parallel ribs provided on the upper side, which plate can be attached under the rail foot such that a rib is arranged on both sides of the rail. Furthermore, the vibration absorber arrangement has a first supporting profile which can be attached to one of the two ribs for support on the rail foot, and a second supporting profile which can be attached to the other of the two ribs for support on the rail foot. The vibration absorber arrangement also has a first clamping means which can be clamped at a first end between one of the two supporting profiles and the rail foot and can be arranged such that it presses against the rail web at a second end. Furthermore, the vibration absorber arrangement has a first vibration absorber which can be attached on the side of the first clamping means remote from the rail web, the first clamping means being an angled plate with the first region and the second region angled away therefrom and it being possible for the first vibration absorber to be fitted on the second region.

The object of the invention is to provide an improved vibration absorber arrangement.

According to the invention, a vibration absorber arrangement for attaching at least one vibration absorber to a rail is provided, said vibration absorber arrangement comprising: a clamping means which has a clamp fastening portion and a fastening portion for at least one vibration absorber on the outside thereof, it being possible for the clamp fastening portion to be clamped between one end of a clamp and a foot of the rail, and the fastening portion pressing with its inside against a web of the rail, the clamp being configured as an integral spring clip.

The vibration absorber arrangement according to the invention has the advantage that the integral spring clip is easy to fit on the clamping means and is economical to produce because no further individual parts are required.

Advantageous embodiments and developments of the invention are provided in the subclaims and in the description with reference to the drawings.

The above-mentioned embodiments and developments can be combined together as desired, if the combinations make sense. Further possible embodiments, developments and implementations of the invention also include combinations, which have not been explicitly mentioned, of features of the invention described previously or described in the following with reference to the embodiments. In particular, a person skilled in the art will also add individual aspects as improvements or additions to the respective basic form of the present invention.

In a preferred development, at least a portion of the clamping means or the entire clamping means rests on the rail. At least one damping layer can be provided at least between the support of the clamping means and the rail. In this respect, the damping layer is attached, for example to an inside of the clamping means. The advantage of the damping layer is that the clamping means itself acts as a damping means. Furthermore, the damping layer, such as a rubber layer, can be fitted particularly easily beforehand to the clamping means by adhesive bonding or vulcanisation.

According to a further preferred development, the clamping means has a projection for suspending, for example for loosely suspending, or locking an end of the spring clip. The projection has the advantage that it prevents the spring clip from flying off during the dismantling procedure. In turn, during assembly, the spring clip can be positioned relatively easily on the clamping means.

In another preferred development, the clamping means has at least one stop for the spring clip in the longitudinal direction. The stop has the advantage that it prevents the spring clip from being able to inadvertently move beyond the stop in the longitudinal direction of the clamping means. The clamping means can also have in the longitudinal direction two stops, between which the spring clip can be introduced. Furthermore, the projection can also be arranged between the stops to suspend or lock the spring clip on the projection.

In a further preferred development, the spring clip has at least one or two arms with a respective first and second portion and a centre portion arranged inbetween. The centre portion extends along the underside of the rail foot. The first portion in turn extends upwards from the centre portion along a side of the rail foot to hook the spring clip on this side of the rail foot. This means that the spring clip is held from this side on the rail foot. The second portion extends upwards from the centre portion along the opposite side of the rail foot and then along the clamping means such that the second portion engages around the clamping means and presses against the rail, while the spring clip is held by the first portion on the other side of the rail foot. The spring clip with two arms also has the advantage that it extends over a relatively great region of the rail and clamping means and therefore, when assembled, it sits in a very stable manner on the rail and clamping means.

According to a further preferred development, at least the two second portions of the two arms are interconnected and form a closed end of the spring clip. The spring clip can be suspended from or locked on the projection on the outside of the clamping means by the closed end and thus it can be prevented from springing away during the dismantling procedure.

In another preferred development, the clamping means has a holding projection, said holding projection being arranged for example on or next to a terminal edge of the clamp fastening portion of the clamping means. In this respect, the holding projection can be formed in one piece with the clamping means or can be attached as a separate part to the clamping means and can consist for example of metal and/or rubber or can at least comprise this. The holding projection also counteracts an undesirable springing-away action of the spring clip during dismantling and also serves as an assembly aid.

According to a further preferred development, the clamp fastening portion of the clamping means has at least one cut-off corner. Consequently, the weight and material of the clamping means can be reduced, without impairing the operation of the spring clip.

In a preferred development, the outer end of the respective first portion of the spring clip and thereby of the open end of the spring clip is curved outwards or is also curved outwards away from the rail. Consequently, undesirable nicks caused by sharp ends of the spring clip can be avoided.

In the following, the invention will be described in more detail with reference to the embodiments shown in the schematic figures of the drawings, in which.

In the figures of the drawings, identical, functionally identical and identically operating elements, features and components are respectively provided with the same reference numerals, unless indicated otherwise.

Figure 1:
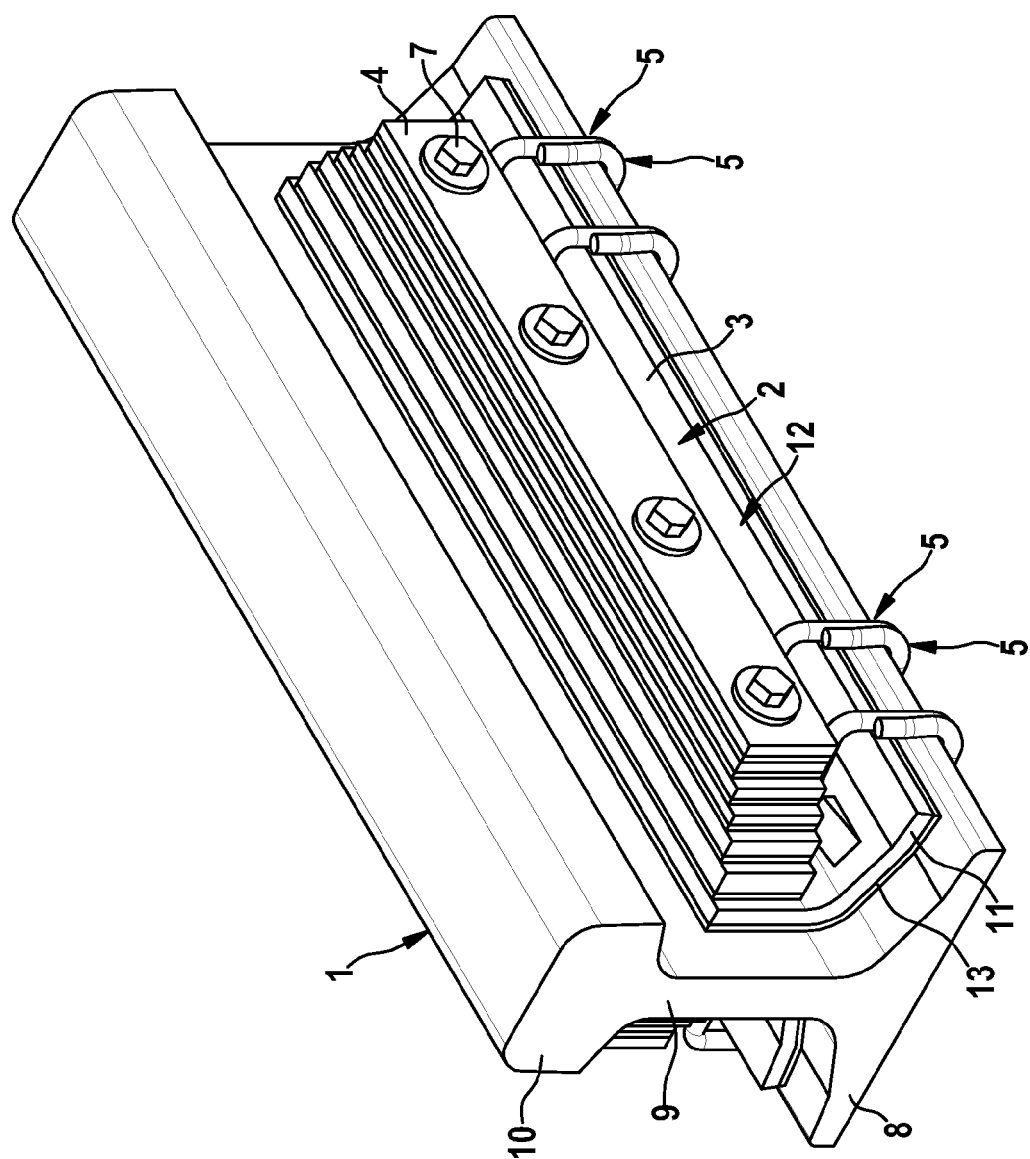
FIG. 1 is a perspective view of a rail with a vibration absorber arrangement according to a first embodiment of the invention.

FIG. 1 is a perspective view of a rail 1 with a vibration absorber arrangement 2 according to a first embodiment of the invention. The vibration absorber arrangement 2 has at least one clamping means 3 with at least one vibration absorber 4, and at least one clamp 5 for fastening the clamping means 3 and the vibration absorber thereof 4 to the rail 1.

The clamp 5 described in the following with reference to FIGS. 1 to 11 is a spring clip which is formed integrally or in one piece. Furthermore, the spring clip is made of spring steel, for example round spring steel or flat spring steel.

In the embodiment shown in FIG. 1, the vibration absorber 4 consists for example of an absorber packet 6 which is fastened to the clamping means 3, for example by vulcanisation and/or by screwing using one or more screws 7. The absorber packet 6 in FIG. 1 consists of a plurality of metal plates, for example steel plates, between which at least one resilient layer, for example a rubber layer, is provided. The metal plates are arranged parallel or substantially parallel to the clamping means 3 and to the rail 1 to be damped.

The vibration absorber 4 can be adapted to the rail 1, for example by the number of steel plates and by the resilient characteristics of the rubber mixture of the respective rubber layer. However, the invention is not restricted to a vibration absorber 4 of this type, but any other suitable vibration absorber can be used to absorb vibrations in rails.

As shown in FIG. 1, the rail 1 has a foot 8 and a head 10 which are interconnected by a web 9. The vibration absorber 4 is respectively arranged on opposite sides of the rail web 9.

For this purpose, the previously mentioned clamping means 3 is respectively provided, for example in the form of an angled plate shown in FIG. 1. The clamping means 3 is made of metal and for example a steel plate or a cast part. The vibration absorber 4 is fastened to the outside of the clamping means 3, for example by screws 7, as shown in FIG. 1. The clamping means 3 is arranged with its inside on the rail 1 and is fastened or clamped to the rail 1 by at least the clamp 5.

In the embodiment shown in FIG. 1, the clamping means 3 has a portion 11 for attaching at least one vibration absorber 4, to which the rail absorber 4 is attached, and a clamp fastening portion 12, on which the clamp 5 can be fitted to attach the clamping means 3. As shown in FIG. 1, the clamping means 3 is arranged with its rail absorber fastening portion 11 on the rail web 9 and with its clamp fastening portion 12 on the rail foot 8. As shown in the embodiment in FIG. 1, the clamp fastening portion 12 can be square or, as in the embodiment shown in the following FIG. 5, it can be configured for example with cut-off corners. However, the invention is not restricted to these configurations of the clamping means 3. The clamp fastening portion 12 can have any other shape which is suitable for fastening the clamping means 3 to a rail 1 by at least one clamp 5.

As shown in FIG. 1, at least one additional damping layer 13 consisting for example of rubber or another suitable material or material combination can optionally be provided on the inside of the clamping means 3. Furthermore, a damping layer 13 of a resilient material, such as rubber, allows tolerance differences in the spacing between the inside of the clamping means 3 and the outside of the rail 1 to be compensated, so that the clamping means 3 can rest on the rail 1 without an air gap inbetween in a support portion provided for this purpose.

Furthermore, as previously described, the clamp 5 is provided for attaching the clamping means 3 and the vibration absorber 4 thereof to the rail 1. The clamp 5 is configured such that it encompasses the foot 8 of the rail 1 and can be brought into contact by one end with the clamping means 3 or with the clamp fastening portion 12 thereof, such that it presses the clamping means 3 against the rail 1, as shown in FIG. 1. For the rail 1 shown in FIG. 1, the clamping means 3 is fastened with its vibration absorber 4 to the rail 1, for example by two clamps 5, in each case one clamp at each end of the clamping means 3. If one clamping means 3 with at least one vibration absorber 4 is fitted on each side or longitudinal side of the rail 1, the clamps 5 for the two clamping means 3 can be mounted inserted one inside the other for example, as shown in FIG. 1 and in the following FIGS. 3 to 7.

Figure 2:
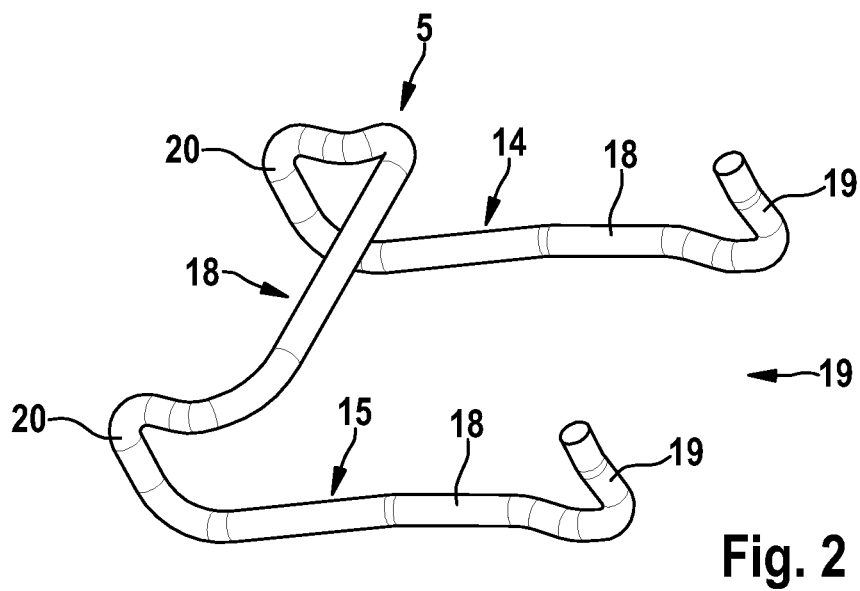
FIG. 2 is a perspective view of a clamp for fastening a clamping means and the vibration absorber thereof to the rail according to FIG. 1.

Furthermore, FIG. 2 is a perspective view of the clamp 5 for fastening the clamping means 3 and the vibration absorber 4 thereof to the rail 1 according to FIG. 1.

As shown in FIG. 2, the clamp 5 has a first arm 14 and a second arm 15 which are interconnected at one end 16. The two arms 14, 15 together form a U shape with a closed end 16 and an open end 17. The open end 17 of the clamp 5 has the advantage that the clamp 5 can be mounted after being put together with a further clamp 5, as previously described with reference to FIG. 1.

Figure 3:
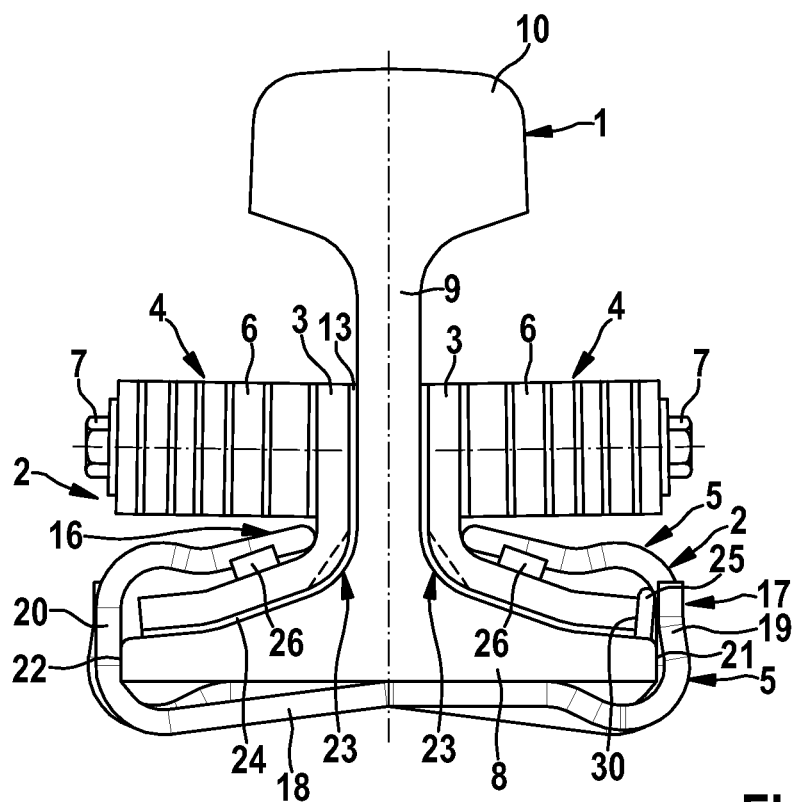
FIG. 3 is a front view of the rail and of the clamping means fastened thereto with the vibration absorbers thereof according to FIGS. 1 and 2.

The first and second arms 14, 15 have a respective first portion 19 and a second portion 20 and a centre portion 18 which is arranged inbetween and extends along the underside of the rail foot 8 in the transverse direction of the foot 8. As shown in FIG. 2 and in the following FIG. 3, the centre portion 18 can be configured such that, when assembled, it rests at least partly on the underside of the rail foot 8 and is also prestressed against the rail foot 8. In this respect, the centre portion 18 of the arms 14, 15 can rest on the rail foot 8, offset with respect to the centre of the foot 8, preferably prestressed against the foot 8, as shown in FIG. 3, or it can rest on the rail foot 8 in the centre thereof, preferably prestressed against the foot 8, as shown in the following FIG. 6.

The first portion 19 is configured such that it extends upwards from the centre portion 18 along a side 21 of the rail foot 8, for example it extends substantially vertically upwards, to engage or to hook the clamp 5 around this side 21 of the rail foot 8.

The second portion 20 in turn is configured such that it extends upwards from the centre portion 18 along the opposite side 22 of the rail foot 8, for example it extends substantially vertically upwards, to engage or to hook the clamp 5 around this side 22 of the rail foot 8, the second portion 20 then also extending over the clamping means 3 such that it engages around the clamping means 3 and, when mounted, presses against the rail 1.

Furthermore, the first and second portions 19, 20 can also be configured such that, when assembled, they are also pressed apart (not shown) by the rail foot 8 to fasten the clamp 5 on the rail foot 8.

In the embodiment shown in FIG. 2 and in the following FIG. 3, the second portion 20 is configured such that, when assembled, it is prestressed against the clamping means 3 and it presses the clamping means 3 against a portion of the rail 1, for example against the rail foot 8, the rail web 9 and/or the transition region 23 between the foot 8 and the web 9.

FIG. 3 is a front view of the rail 1 and of the clamping means 3, fastened thereto, with the vibration absorbers 4 thereof according to FIGS. 1 and 2.

As described previously with reference to FIG. 1, at least one damping layer 13 is arranged between the clamping means 3 and the outside of the rail 1. The damping layer 13 is attached, for example vulcanised or affixed to the clamping means 3, to name but a few of many possibilities, to provide the clamping means 3 with the damping layer 13. In principle, the damping layer 13 can also be inserted for example as a separate part between the clamping means 3 and the rail 1 or can be affixed to or vulcanised on the rail 1.

In the embodiment shown in FIG. 3, the contour of the inside of the clamping means 3, by which this is fastened to the rail 1, corresponds for example to the contour of the outside of the rail 1. Accordingly, the clamping means 3 rests with the damping layer 13 fully on the rail 1. Alternatively, the clamping means 3 can also rest with the damping layer 13 only on at least a portion of the rail 1, for example on a portion 23 of the transition between rail foot 8 and rail web 9, on a portion of the rail web 9 and/or on a portion of the rail foot 8, as indicated in FIG. 3 by a dashed line.

Furthermore, the clamping means 3 extends partly or substantially completely over the upper side 24 of the rail foot 8, as shown in FIG. 3.

As shown in the embodiment in FIG. 3, a lip or a holding projection 25 can optionally also be provided on or next to a terminal edge 30 of the clamp fastening portion 12 of the clamping means 3. The holding projection 25 is positioned such that, when the clamp 5 is mounted, it is positioned between the arms 14, 15 of the clamp 5. The holding projection 25 also has a suitable height so that, during dismantling, the clamp 5 can initially remain hanging from the holding projection 25 by its closed end 16 or can be held by the holding projection. This prevents the clamp 5 from inadvertently flying off during the dismantling procedure.

The projection 25 can be attached, for example by bonding, vulcanising etc., to the terminal edge 30 as a separate part consisting of rubber, for example. Likewise, the projection 25 can also be formed in one piece or integrally with the clamping means 3.

A further embodiment of the projection 25 is described in the following FIGS. 10 and 11.

The outside of the clamping means 3 can also be configured with at least one lateral stop 26 for the clamp 5 in the form of a projection. The stop 26 on one side of the clamp 5 serves to prevent or restrict the lateral movement of the clamp 5 or the movement of the clamp 5 in the longitudinal direction of the clamping means 3 and of the rail 1.

Figure 4:
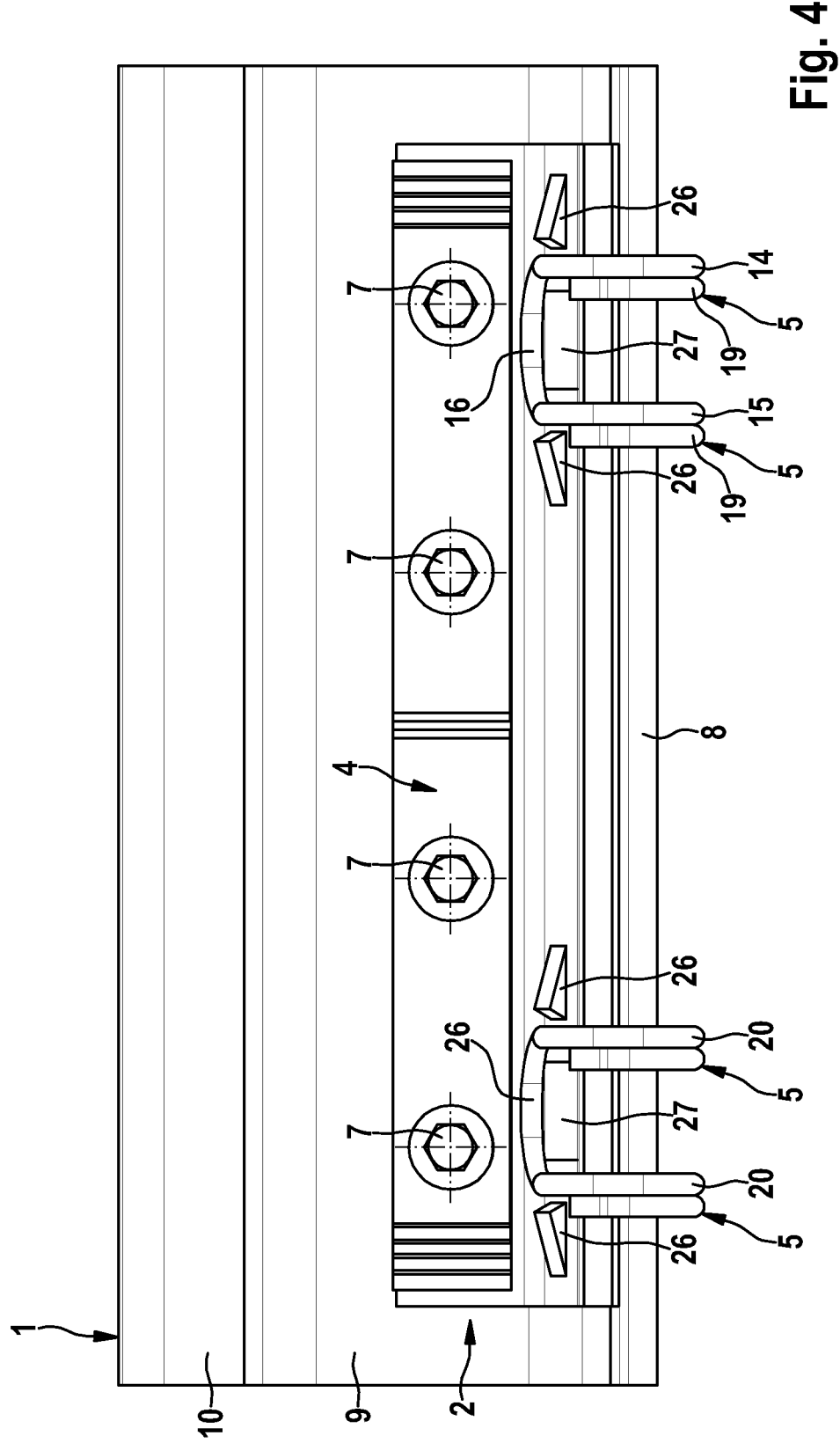
FIG. 4 is a side view of the rail 1 and of the vibration absorber arrangement 2 according to FIG. 1.

FIG. 4 is a side view of the rail 1 and of the vibration absorber arrangement 2 according to FIG. 1.

As shown in FIG. 4, the clamping means 3 or the clamp fastening portion 12 thereof has the stop 26 in the form of a projection on each side of the clamp 5 in the longitudinal direction, to fix the clamp 5 in the longitudinal direction of the clamping means 3 and accordingly, when mounted, in the longitudinal direction of the rail 1. For this purpose, the clamp 5 is introduced by one end between the two stops 26 and is thereby prevented from inadvertently moving beyond the stops 26 in the longitudinal direction.

In addition to or instead of the stops 26, as shown in FIG. 4, the clamping means 3 has on its outside a projection 27, to be encompassed by the clamp 5. The projection 27 can cooperate with the clamp 5 such that, in the mounted state, the clamp 5 is suspended or is loosely suspended by its closed end 16 from the projection 27 or alternatively is locked on the projection 27.

The projection 27 on the outside of the clamping means 3 has the advantage that during removal or dismantling, the clamp 5 cannot inadvertently spring away. Furthermore, the clamp 5 can be positioned on and fastened to the clamping means 3 relatively easily in that it is suspended from or locked by its closed end 16 on the projection 27 of the clamping means 3 on one side 22 of the rail foot 8 and is hooked in by its open end 17 on the opposite side 21 of the rail foot 8.

As the holding projection 25 is also provided on the terminal edge 30 of the clamp fastening portion 12 of the clamping means 3, as shown in FIG. 3 and in the following FIGS. 10 and 11, during the dismantling procedure, the clamp 5 can initially be held on the projection 27 and the clamp 5 can be prevented from inadvertently flying away. As soon as the clamp 5 is released from the projection 27, the clamp 5 can be held by the holding projection 25 and prevented from inadvertently flying away. As previously described, the clamp 5 can initially remain suspended from the holding projection 25 before it is completely removed from the rail and the clamping means 3.

Since the respective first portion 18 of the clamp 5 only extends upwards along the side 21 of the rail foot 8, it can easily be pressed downwards to dismantle the clamp 5 and can thereby be disengaged from the rail foot 8. Consequently, the clamp 5 can be easily released by a user and the vibration absorber arrangement 2 can be quickly and easily dismantled again as required.

Figure 5:
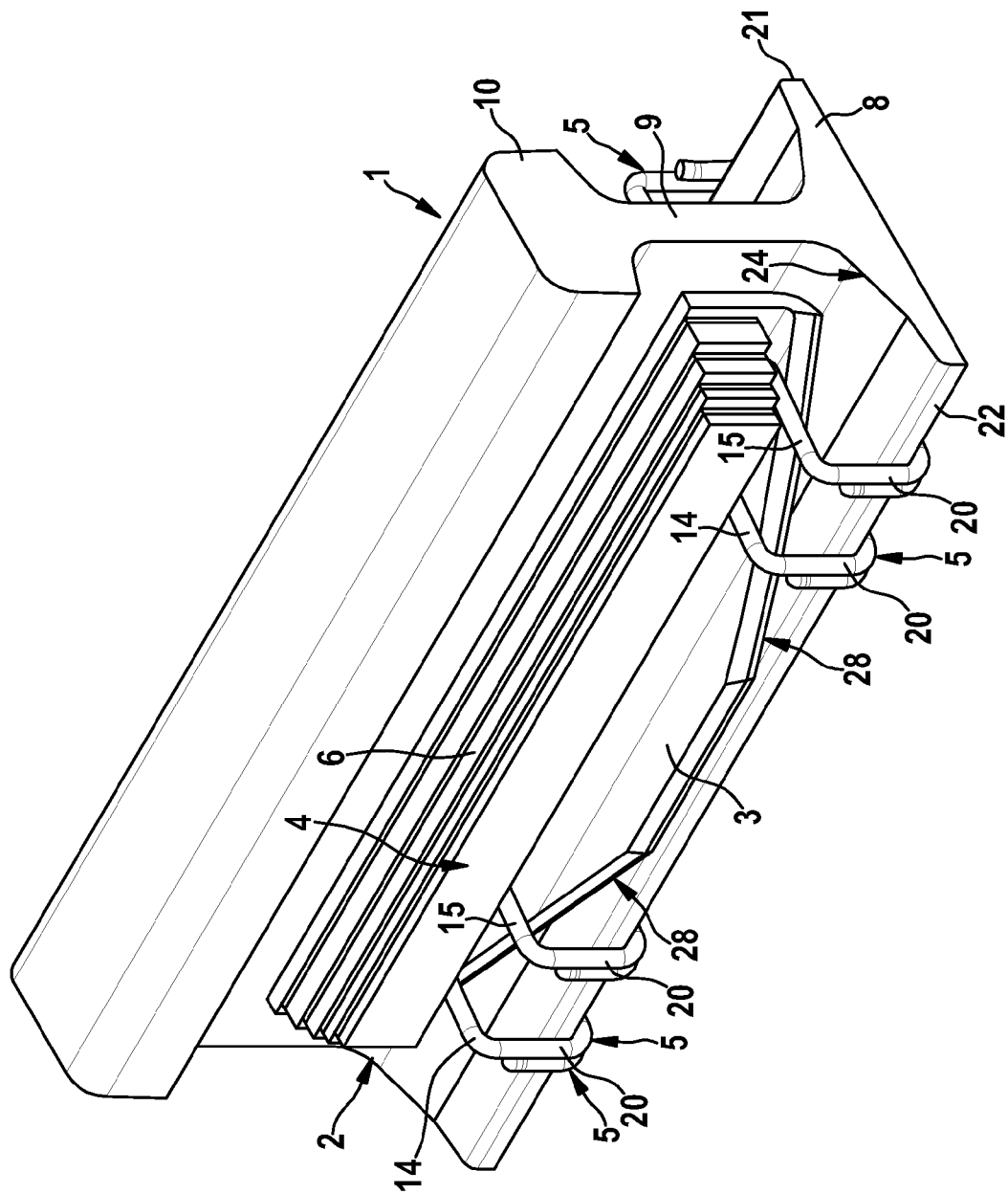
FIG. 5 is a perspective view of a rail 1 with a second embodiment of a vibration absorber arrangement 2 according to the invention.
Figure 6:
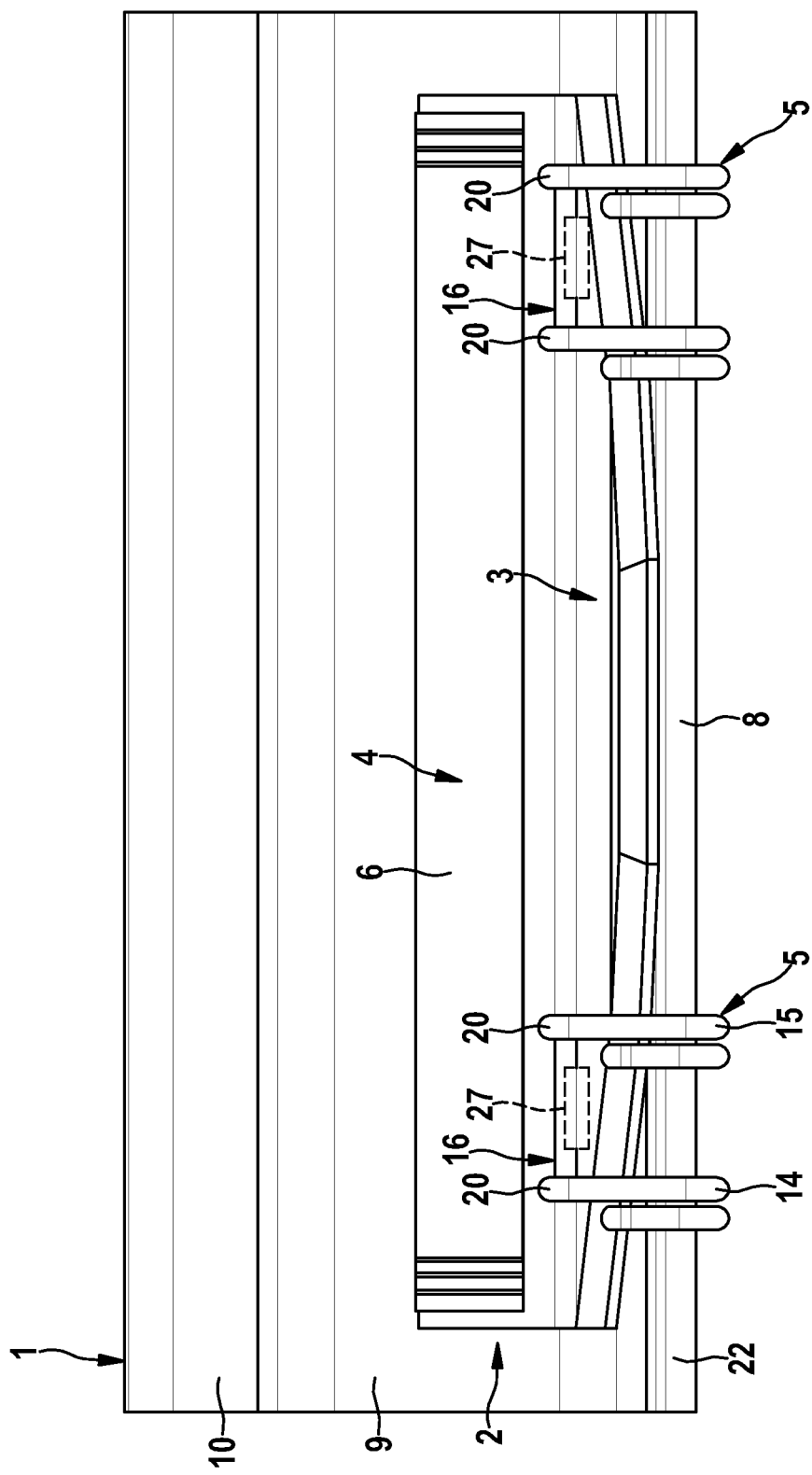
FIG. 6 is a side view of the rail and of the vibration absorber arrangement according to FIG. 5.

FIG. 5 is a perspective view of a rail 1 with a second embodiment of a vibration absorber arrangement 2 according to the invention. FIG. 6 in turn is a side view of the rail and of the vibration absorber arrangement 2 according to FIG. 5. Here, the rail 1 is the same rail 1 as in FIGS. 1 to 4. Reference is made to the description of FIGS. 1 to 4 with respect to the common features of the first and second embodiments, to avoid unnecessary repetition.

The vibration absorber arrangement 2 according to the second embodiment differs from the vibration absorber arrangement according to the first embodiment in that the clamp fastening portion 12 of the clamping means 3 according to the second embodiment has cut-off corners 28. This has the advantage that the clamping means 3 is lighter and nevertheless can be fastened to the rail 1 with a respective clamp 5 at the end.

The vibration absorber 4 according to the second embodiment also differs from the vibration absorber 4 according to the first embodiment in that the absorber packet 6 in the second embodiment, as shown in FIG. 5, is attached to the clamping means 3 by vulcanisation or adhesive bonding instead of by screwing, as in the first embodiment.

Furthermore, the form of the clamp 5 of the second embodiment differs from the form of the clamp 5 of the first embodiment, as will be described in more detail in the following with reference to FIGS. 6, 7 and 8.

In addition, the second embodiment does not have any additional stops for laterally fixing the clamp 5, as in the first embodiment, but only the projection 27 in each case, as indicated by a dotted line in FIG. 5, to be encompassed by the closed end 16 of the clamp 5. As previously described, when mounted, the clamp 5 is for example merely loosely suspended from or locked on the projection 27. As previously described, the advantage of the projection 27 is that it prevents the clamp 5 from undesirably springing off during the dismantling procedure.

Figure 7:
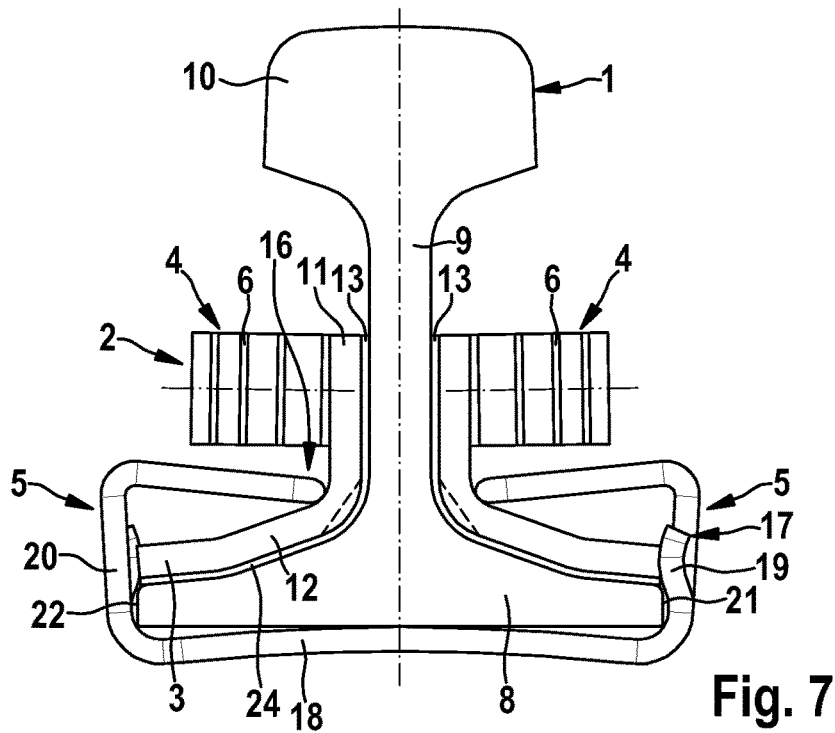
FIG. 7 is a side view of the rail and of the clamping means fastened thereto with the vibration absorbers thereof according to FIGS. 5 and 6.

FIG. 7 is a side view of the rail 1 and of the clamping means 3, fastened thereto, with the vibration absorbers 4 thereof.

At least one additional damping layer 13 can optionally also be arranged between the clamping means 3 and the outside of the rail 1, as shown in FIG. 7.

In the embodiment shown in FIG. 7, the contour of the inside of the clamping means 3, by which this is fastened to the rail 1, corresponds for example to the contour of the outside of the rail 1. The clamping means 3 can also rest with the damping layer 13 only on at least a portion of the rail 1, for example on a portion or transition region 23 between rail foot 8 and rail web 9, on a portion of the rail web 9 and/or on a portion of the rail foot 8, as indicated in FIG. 7 by a dashed line.

Furthermore, the clamping means 3 extends with its clamp fastening portion 12 at least in part or completely as far as the side 22 of the rail foot 8, as shown in FIG. 7.

To fasten the clamping means 3 with its rail absorber 4 on the rail 1, the clamp 5 in the second embodiment, like the clamp 5 according to the first embodiment, has a first arm 14 and a second arm 15 which are interconnected at one end. The two arms 14, 15 together form a U shape with a closed end 16 and an open end 17.

The first and second arms 14, 15 have a respective first and second portion 19 and 20 and a centre portion 18 inbetween. The centre portion 18 extends along the underside of the rail foot 8 in the transverse direction thereof.

As shown in FIG. 6, the centre portion 18 can be configured such that when assembled, it rests at least in part on the underside of the rail foot 8 and is optionally also prestressed against the rail foot 8. As previously shown in FIG. 3, the centre portion 18 of the arms 14, 15 can rest on the rail foot, laterally offset with respect to the centre of the foot 8, and optionally also prestressed against the foot 8, or it can rest on the rail foot in the centre of the foot 8, and can optionally also be prestressed against the foot, as shown in FIG. 6.

The first portion 19 of the clamp arms 14, 15 is configured such that it extends upwards from the centre portion 18 along a side 21 of the rail foot 8 to engage or to hook the clamp 5 around this side 21 of the rail foot 8. The first portion 19 is also slightly curved outwards preferably with its outer end 29 or, as shown in the following FIGS. 7 and 8, is bent away outwards from the clamping means 3 or the rail 1. This has the advantage that during assembly, the rail 1 is also protected against undesirable nicks caused by sharp-edged ends of the clamp 5.

The second portion 20 in turn is configured such that it initially extends upwards from the centre portion 18 along the opposite side 22 of the rail foot 8 to hook onto the rail foot 8 and then extends along the clamping means 3. As shown in FIG. 6, the second portion 18 bends, for example downwards, to the clamping means 3 to press the clamping means 3 against the rail 1 in the assembled state.

Furthermore, the first and second portions 19, 20 can optionally be configured such that, when assembled, they are pressed apart, as shown in FIG. 7, and are laterally prestressed against the rail foot 8 to fasten the clamp 5 on the rail foot 8.

In the embodiment shown in FIG. 7, the second portion 20 is configured such that it is prestressed against the outside of the clamping means 3 and, when assembled, it pushes or presses the clamping means 3 against the rail 1, for example against the rail foot 8, against the rail web 9 and/or against the transition region 23 between the foot 8 and the web 9.

Figure 8:
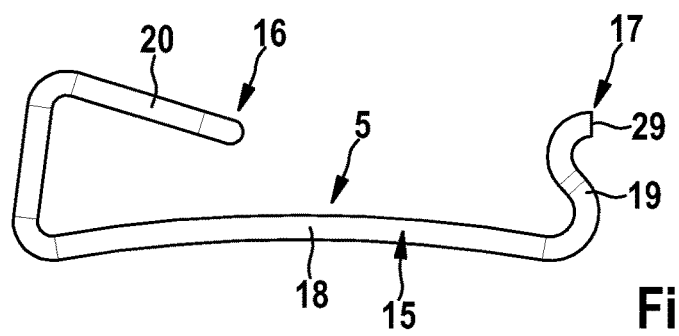
FIG. 8 is a side view of a clamp according to a further embodiment of the invention.
Figure 9:
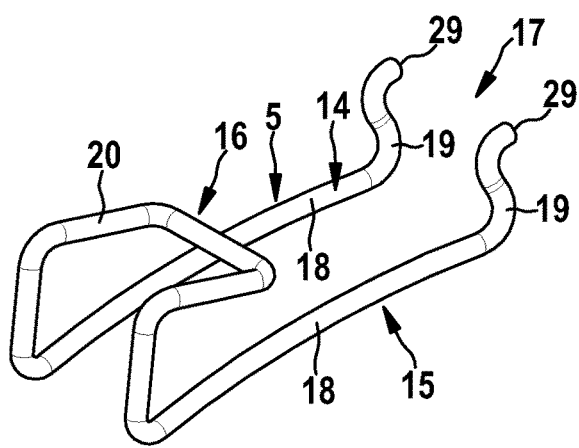
FIG. 9 is a perspective view of the clamp according to FIG. 8.

FIGS. 8 and 9 show a further embodiment of the clamp 5 according to FIGS. 5, 6 and 7. FIG. 8 is a side view of the clamp 5 and FIG. 9 is a perspective view. The clamp 5 according to the embodiment in FIGS. 8 and 9 differs from the clamp 5 in FIGS. 5, 6 and 7 only in that the outer ends 29 of the clamp 5 are bent outwards or are bent away from the clamping means 3 and thereby from the rail 1, thereby making it possible to avoid undesirable nicks in the rail 1 when the clamp 5 is fitted.

Figure 10:
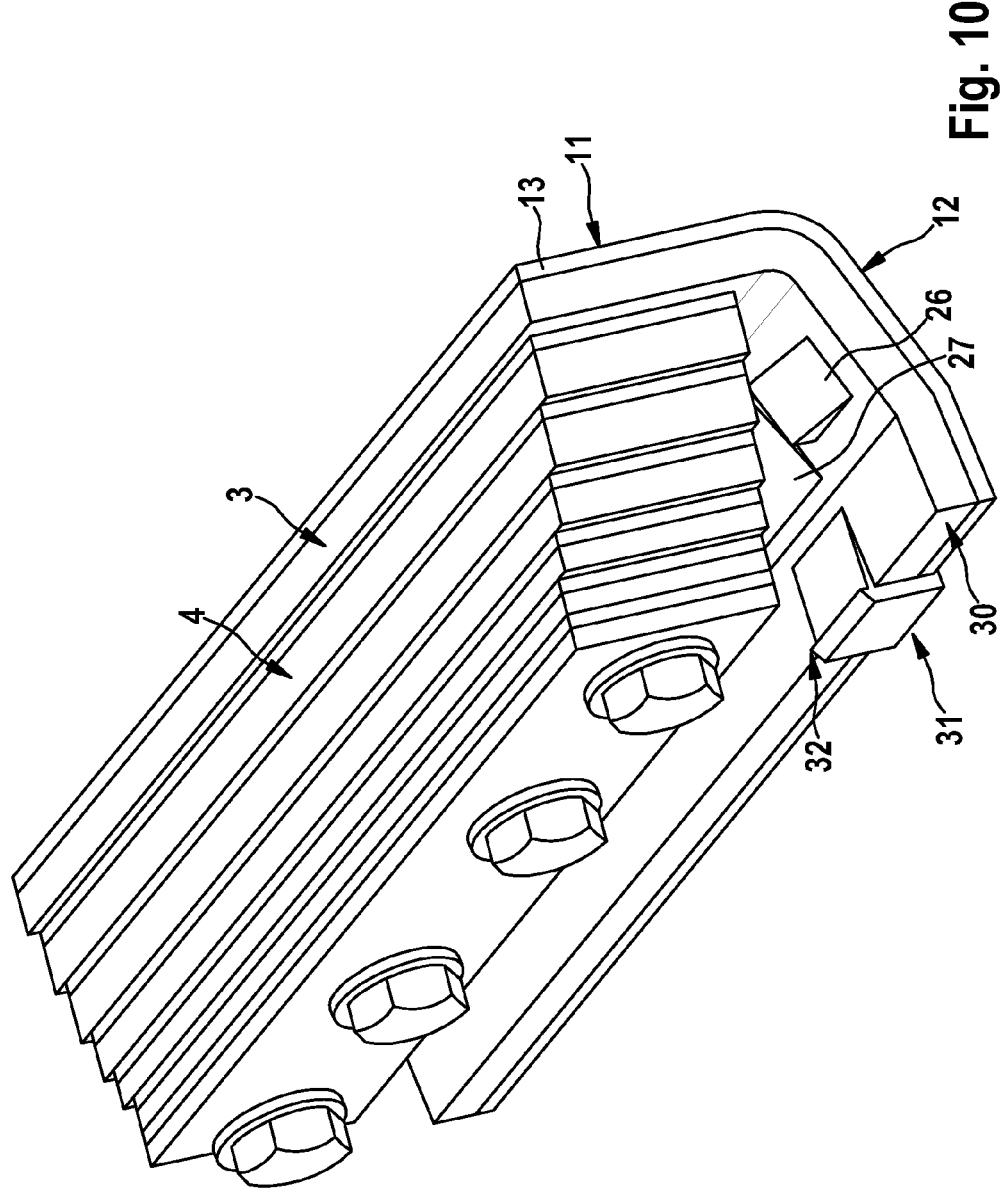
FIG. 10 is a perspective view of a clamping means with a vibration absorber according to a vibration absorber arrangement of the invention.
Figure 11:
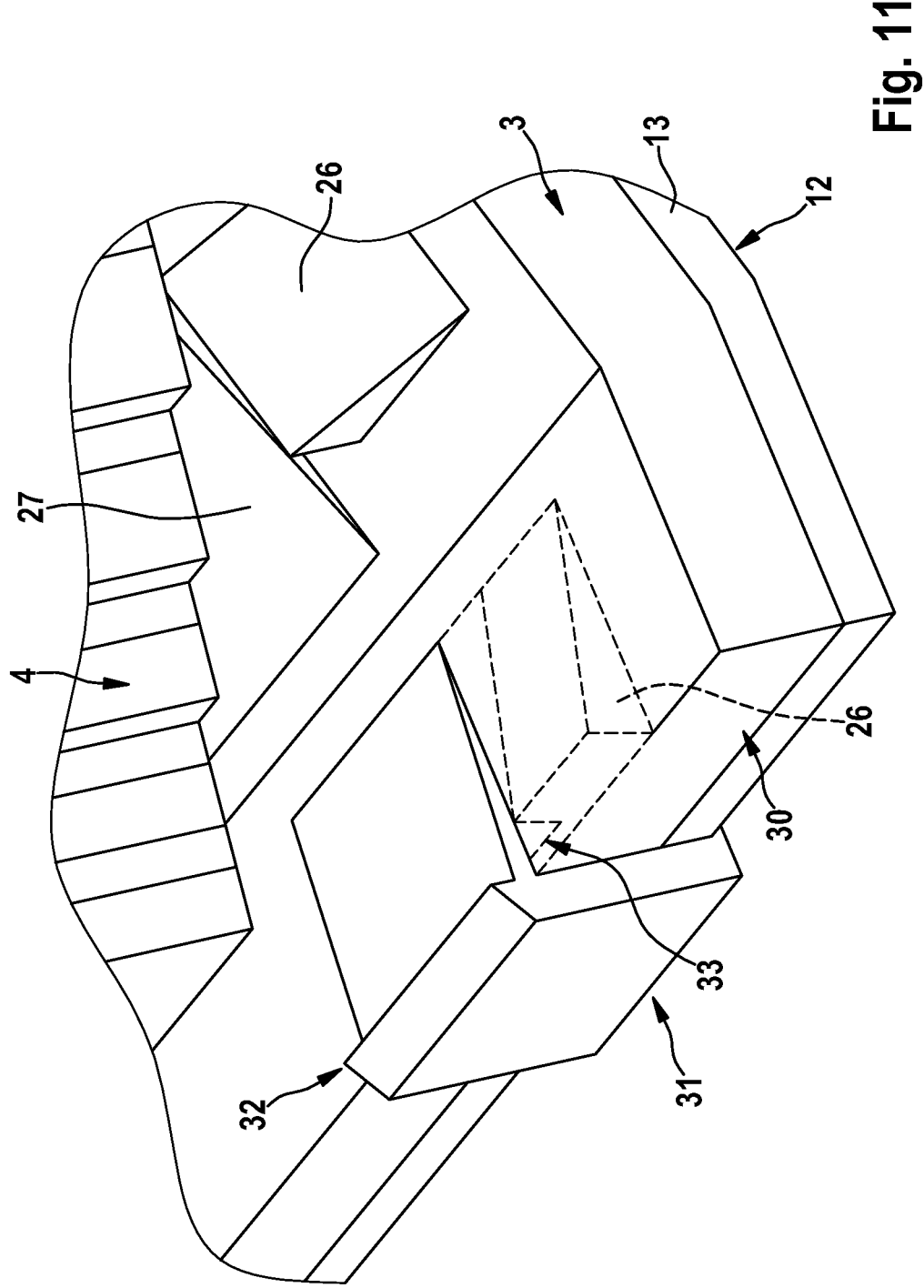
FIG. 11 shows a detail of the clamping means and of the vibration absorber thereof according to FIG. 10.

Furthermore, FIGS. 10 and 11 show a clamping means 3 and a vibration absorber 4 according to a vibration absorber arrangement of the invention. FIG. 10 is a perspective view and FIG. 11 shows a detail of the clamping means 3 and of the vibration absorber 4 attached thereto.

The clamping means 3 has a fastening portion 11 for the at least one vibration absorber 4 and a clamp fastening portion 12 for fastening at least one clamp 5. Furthermore, as shown in the embodiment in FIGS. 10 and 11, the clamping means 3 optionally has an additional damping layer 13 on its underside. This additional damping layer is attached to the underside of the clamping means 3 for example by affixing, vulcanising etc.

In addition, the clamping means 3 has on the outside of its clamp fastening portion 12 a projection 27 to be encompassed by the closed end 16 of the clamp 5, and also has on both sides of the projection 27 in the longitudinal direction of the clamping means 3 a respective stop 26 for restricting the movement of the clamp 5 in the longitudinal direction. The projection 27 and the stops 26 have been previously described with reference to FIGS. 3, 4 and 6 and have been shown therein.

The holding projection 25, as previously described with reference to FIG. 3, is configured in the embodiment as shown in FIGS. 10 and 11 for example as a clamp element 31 with an elevation 32. Here, the clamp element 31 has a U shape for example, by which it is attached or clamped on the terminal edge 30 of the clamp fastening portion 12 and additionally or alternatively is bonded with the clamping means 3 and/or is vulcanised thereon. The elevation 32 of the clamp element 31 is arranged on the upper side of the clamping means 3 such that it aligns with the projection 27.

In a further embodiment, instead of being provided in the longitudinal direction of the clamping means 3 next to the projection 27, the stop 26 can also be provided next to the holding projection 25 to prevent an undesirable sideways movement of the clamp.

The stop 26 can be arranged next to the holding projection 25 or, in a further embodiment, it can also be directly formed on the holding projection 25, as indicated in FIG. 11 by a dashed line. The holding projection 25 can be formed on both sides with the stop 26 instead of being formed on only one side, as shown in FIG. 11.

Therefore, the stop 26 which is shown in FIG. 11 and is arranged on the side of the projection 27 in the longitudinal direction of the clamping means 3 can be omitted.

The holding projection 25 can be formed in one piece with the stop 26, for example from metal and/or rubber, and can be attached to the clamping means 3. Likewise, the clamping means 3, together with the holding projection 25 and the stop 26 thereof can be formed in one piece from metal.

With a metal holding projection 25 and stop 26, a gap 33 is provided between the elevation 32 of the holding projection 25 and the stop 26 to receive the respective arm of the clamp. However, if the holding projection 25 and the stop thereof are made of a resilient material such as rubber, it is then also possible to dispense with the gap 33, for example.

In the assembled state, a clamp for fastening the clamping means 3 to a rail encompasses the projection 27 with its closed end, the holding projection 25 being arranged on the inside of the arms or between the arms of the clamp. As soon as the closed end of the clamp slips down from the projection 27 during the dismantling procedure and moves in the direction of the terminal edge 30 of the clamping means 3, the closed end of the clamp initially remains suspended from the holding projection 25 and consequently cannot inadvertently spring away.

Instead of a clamp element 31 with an elevation 32 as shown in FIGS. 10 and 11, an elevation of this type can also be attached to the upper side of the clamping means without the clamp element 31 or can be formed in one piece with the clamping means 3 (not shown).

The holding projection 25 can be clamped, affixed and/or vulcanised on the clamping means or alternatively can be formed in one piece with the clamping means. As previously described, the holding projection 25 has the advantage that during the dismantling procedure, the clamp can also remain suspended from the holding projection 25 so that it does not inadvertently fly off. Furthermore, during preassembly, the clamp can initially engage on the holding projection 25 so that it cannot slip down. Thus, the clamp 5 can subsequently be easily assembled with a suitable device.

Although the present invention has been described above with reference to the preferred embodiments, it is not restricted thereto, but can be modified in many different ways. In particular, the previously described embodiments can be combined with one another, particularly individual features thereof.

In particular, in the previously described embodiments according to the invention of the vibration absorber arrangement, the clamps, vibration absorbers and/or clamping means of the individual embodiments can be combined with one another.

LIST OF REFERENCE NUMERALS

1 rail
2 vibration absorber arrangement
3 clamping means
4 vibration absorber
5 clamp
6 absorber packet
7 screw
8 rail foot
9 rail web
10 rail head
11 fastening portion for vibration absorber
12 clamp fastening portion
13 damping layer
14 first arm
15 second arm
16 closed end of clamp
17 open end of clamp
18 centre portion of arm of clamp
19 first portion of arm of clamp
20 second portion of arm of clamp
21 side of rail foot
22 opposite other side of rail foot
23 transition region of rail foot and rail web
24 upper side of rail foot
25 holding projection
26 stop in form of projection
27 projection
28 cut-off corners
29 outer end of first portion of arm of clamp
30 terminal edge of clamp fastening portion of clamping means
31 clamp element
32 elevation
33 gap

The invention claimed is:

1. A vibration absorber arrangement for attaching at least one vibration absorber to a rail having a foot and a web, comprising:
    a clamping means including a clamp fastening portion and an absorber fastening portion for engaging the at least one vibration absorber,
    wherein the clamping means is arranged with its absorber fastening portion on the rail web and with its clamp fastening portion on the rail foot;
    a clamp provided for attaching the clamping means to the rail, wherein the clamp is formed as an integral spring clip,
    wherein the clamp is configured such that it encompasses the foot of the rail and presses by a first end the clamp fastening portion against the rail,
    wherein the spring clip has at least one arm having in each case a first and a second portion and a center portion which is arranged in between and extends along the underside of the rail foot and wherein the first portion extends upwards from the center portion along a side of the rail foot to hook the spring clip on said side of the rail foot and the second portion extends upwards from the center portion along an opposite side of the rail foot and then along the clamping means such that it engages around the clamping means and presses against the rail.

2. The vibration absorber arrangement according to claim 1, characterized in that at least a portion of the clamping means or the entire clamping means rests on the rail and wherein at least one damping layer is provided at least between the clamping means and the rail.

3. The vibration absorber arrangement according to claim 2, characterized in that the damping layer being attachable to an inside of the clamping means.

4. The vibration absorber arrangement according to claim 1, characterized in that the clamping means has a projection for suspending or locking an end of the spring clip.

5. The vibration absorber arrangement according to claim 1, characterized in that the clamping means has at least one stop for the spring clip in the longitudinal direction.

6. The vibration absorber arrangement according to claim 5, characterized in that the stop is provided on the clamping means next to the projection or the holding projection in the longitudinal direction of the clamping means.

7. The vibration absorber arrangement according to claim 5, characterized in that the clamping means has a projection for suspending or locking an end of the spring clip.

8. The vibration absorber arrangement according to claim 5, characterized in that the clamping means has in the longitudinal direction two stops between which the spring clip can be introduced.

9. The vibration absorber arrangement according to claim 5, characterized in that the clamping means has a projection for locking an end of the spring clip.

10. The vibration absorber arrangement according to claim 1, characterized in that at least two arms are provided and at least the two second portions of the two arms are interconnected and form a closed first end of the spring clip.

11. The vibration absorber arrangement according to claim 1, characterized in that the clamping means has a holding projection.

12. The vibration absorber arrangement according to claim 11, characterized in that the holding projection is arranged such that it aligns with the projection in the transverse direction of the clamping means.

13. The vibration absorber arrangement according to claim 11, characterized in that the clamping means has a projection for suspending an end of the spring clip.

14. The vibration absorber arrangement according to claim 11, characterized in that the clamping means has at least one stop for the spring clip in the longitudinal direction.

15. The vibration absorber arrangement according to claim 14, characterized in that the clamping means has in the longitudinal direction two stops between which the spring clip can be introduced.

16. The vibration absorber arrangement according to claim 14, characterized in that the clamping means has in the longitudinal direction two stops between which the spring clip can be introduced.

17. The vibration absorber arrangement according to claim 11, characterized in that the clamping means has a projection for locking an end of the spring clip.

18. The vibration absorber arrangement according to claim 1, characterized in that the clamp fastening portion of the clamping means has at least one cut-off corner.

19. The vibration absorber arrangement according to claim 1, characterized in that the outer end of the respective first portion of the spring clip is curved outwards or is bent away outwards from the rail.

20. The vibration absorber arrangement according to claim 19, characterized in that the spring clip is produced from round spring steel or flat spring steel.

21. The vibration absorber arrangement according to claim 20, characterized in that the holding projection being arranged on or next to a terminal edge of the clamp fastening portion of the clamping means and the holding projection being formed in one piece with the clamping means or being attached as a separate part to the clamping means.

22. The vibration absorber arrangement according to claim 1, characterized in that the vibration absorber has an absorber packet with at least two plates and at least one resilient layer arranged in between.

23. The vibration absorber arrangement according to claim 22, characterized in that the at least two plates are metal plates.

24. A rail having a foot and a web with a vibration absorber arrangement according to claim 1.

* * * * *